March 22, 1960 L. B. HAIGH ET AL 2,929,881

TERMINAL-PER-STATION TELEPHONE PARTY-LINE SWITCHING SYSTEM

Filed Dec. 5, 1955

3 Sheets-Sheet 1

March 22, 1960 L. B. HAIGH ET AL 2,929,881

TERMINAL-PER-STATION TELEPHONE PARTY-LINE SWITCHING SYSTEM

Filed Dec. 5, 1955

3 Sheets-Sheet 2

March 22, 1960 L. B. HAIGH ET AL 2,929,881

TERMINAL-PER-STATION TELEPHONE PARTY-LINE SWITCHING SYSTEM

Filed Dec. 5, 1955

3 Sheets-Sheet 3

United States Patent Office 2,929,881

Patented Mar. 22, 1960

2,929,881

TERMINAL-PER-STATION TELEPHONE PARTY-LINE SWITCHING SYSTEM

Leslie B. Haigh, West Orange, N.J., and John I. Bellamy, Wheaton, Ill., assignors to International Telephone and Telegraph Corporation, New York, N.Y., a corporation of Maryland Application December 5, 1955, Serial No. 551,192

6 Claims. (Cl. 179—17)

Figure 1:
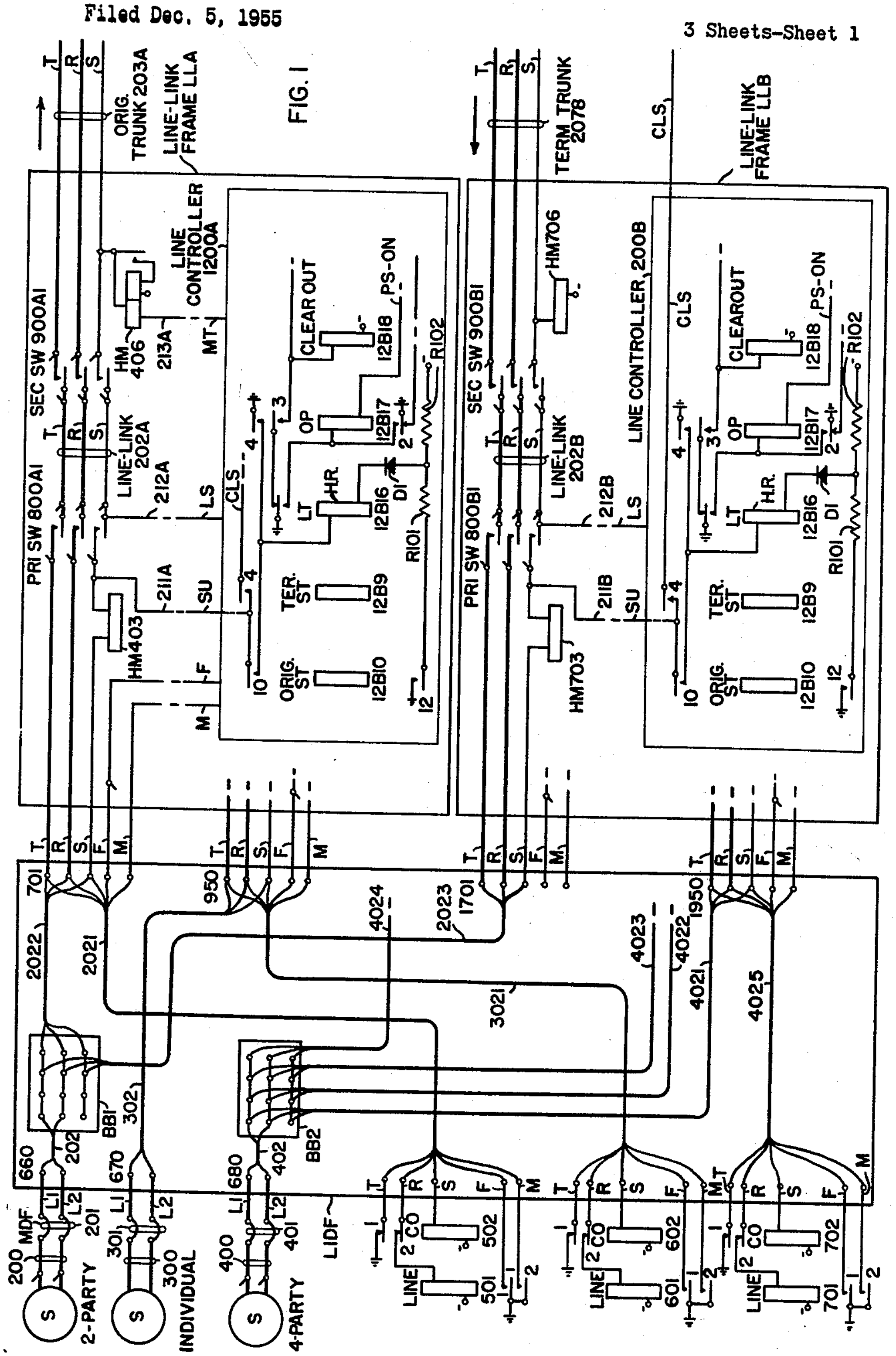

This invention relates to a terminal-per-station telephone party-line switching system. Its principal object is to provide switching-contact economies in telephone systems of the type providing called-terminal-per-station party-line service.

As used herein with reference to a switchboard appearance of a subscriber line, the expression "terminal," or "calling terminal," or "called terminal," may refer collectively to a set of switching contacts for the line and the corresponding switchboard multiples of this contact set. In manual practice, an example is the conventional 3-conductor jack and its multiples to provide a number of equivalent tip, ring, and sleeve appearances of the line for call-answering or for call-completing purposes.

The usual so-called terminal-per-station telephone party-line system (termed a jack-per-station system in manual practice) is more correctly termed a called-terminal-per-station system, for each line thereof uses a separate calling terminal in addition to as many called terminals as it has stations. Thus the total number of switchboard terminals (calling and called) used in such a system is the number of the stations in service, plus the number of lines serving them.

According to the invention, a true-terminal-per-station telephone party-line system is provided which requires only as many switchboard terminals as there are stations served, thus saving as many switchboard terminals as there are lines in service. This result is obtained by arranging that any switchboard terminal may be readily adapted (1) to serve merely as one of the two or more called terminals assigned to a party line; (2) to serve also as the calling terminal for that line; or (3) to serve as both the called terminal and the calling terminal of a single-station line.

A well-understood advantage of the usual so-called terminal-per-station system, which is completely retained in the more economical system proposed herein, is operating flexibility which permits most of the routine service changes to be handled without requiring the assignment of new telephone numbers. For this purpose, the called terminals at the switchboard have respective telephone numbers assigned thereto according to switchboard location, and any such called terminal is treated as representing a specific subscriber station whether such station is on an individual line or is merely one station on a party line. For convenience, an intermediate distributing frame, termed a line IDF (or LIDF), is usually interposed between the called terminals and the subscriber lines, with provisions for jumpers thereon for connecting the called terminals to the lines singly or in groups, as required initially, or as is required from time to time.

It has been chosen to disclose the invention as embodied in a telephone switching system generally as shown in United States Patent No. 2,674,657 for a Primary-Secondary-Spread Crossbar Telephone System, hereinafter termed the reference patent. In the reference patent, a two-way line-link arrangement is disclosed which permits a single terminal per line to be used, both as the calling terminal and as the called terminal of the associated line, whether for individual-line service or for station-suffix party-line service. While highly economical in its use of line terminals at the switchboard, this system lacks the operating flexibility as to routine service changes possessed by called-terminal-per-station systems. Consequently, a specific object of the invention is to revise the system of the reference patent to incorporate the required operating flexibility from the party-line service angle while retaining the essential switchboard-terminal economy thereof, together with its several other desirable attributes.

In revising the system of the reference patent to incorporate the invention, the following changes have sufficed:

(1) A line IDF has been provided for the foregoing usual purpose of connecting called terminals to the lines as required and for an additional purpose set forth below;

(2) The line relays, together with their respective cutoff-relay equivalents, have been removed from in fixed association with the line terminals individually, and line equipments in the form of sets of line and cutoff relays have been placed in a common pool from which available ones can be assigned as needed to the combined terminals (those used for calling service as well as for called service), thus leaving the called-only terminals without the unrequired line equipments. Jumpers are employed on the line IDF to connect the assigned line equipments operatively to the respective combined terminals;

(3) At each switchboard terminal for a line, comprising a crossbar-switch vertical having a hold magnet, the hold magnet is serially related to the sleeve conductor of the line multiple for operation and holding over a jumper conductor on the line IDF whenever that terminal is used;

(4) When a party line is seized at any terminal thereof, the resulting change in sleeve potential at the junction of the operated hold magnet and the cutoff relay is relied on to mark the line busy at its other terminals, and the circuit arrangement for line testing at the line and block controllers has been revised to insure that an initial response to an idle-test condition of a terminal of a party line is changed promptly to a busy-test response upon seizure of any other terminal of the line, to minimize double seizures; and (5) The block couplers have been revised to receive all station-ringing indications from the block translator rather than from a called stations digit, and the block translator has been revised to include a section which controls any block coupler to apply a separate station-ringing condition to any called party line according to the terminal through which it is called, which is also according to the telephone number used in making the call.

Two embodiments are disclosed of the added section of the block translator, comprising an individual-translation embodiment for maximum operating flexibility from the party-line service standpoint, and a simpler group-translation embodiment which provides a correspondingly lesser operating flexibility which may, nevertheless be satisfactory in many instances.

Figure 2:
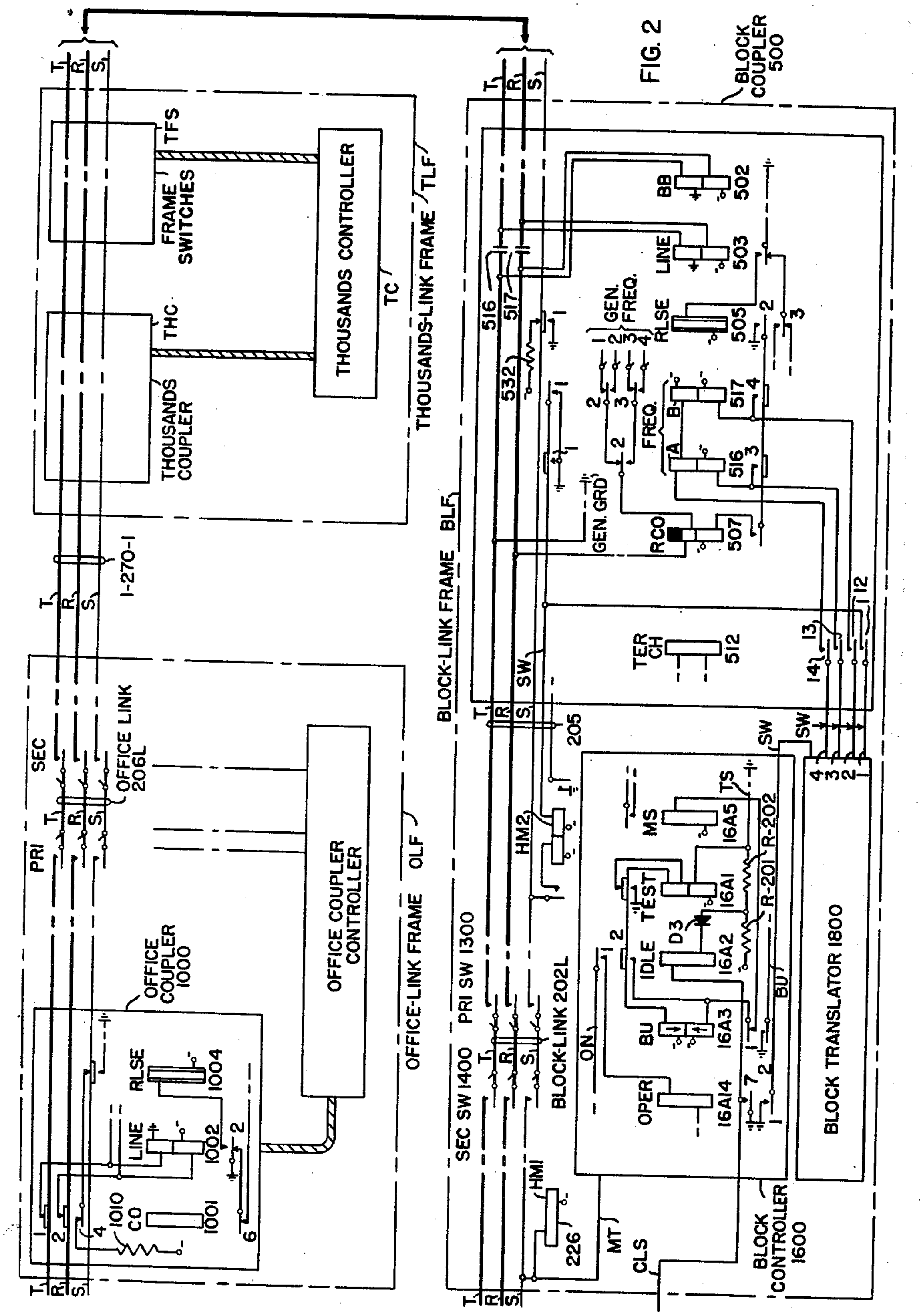
Figures 3, 4:
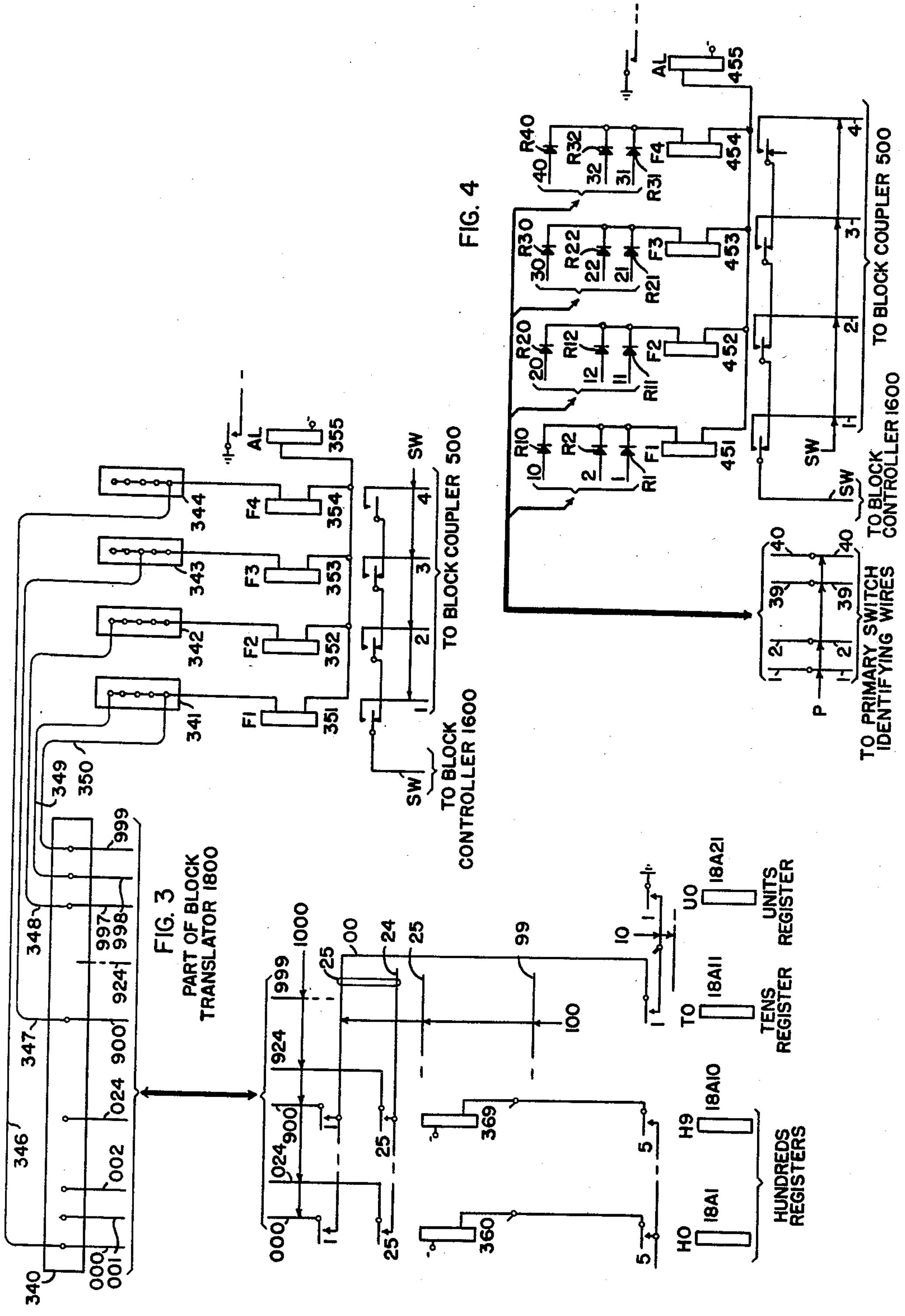

The above-mentioned and other features and objects of this invention and the manner of attaining them will become more apparent, and the invention itself will be best understood, by reference to the following description of the invention taken in conjunction with the accompanying drawings comprising Figs. 1 to 4, wherein:

Figs. 1 and 2 taken together, disclosed a simplified call-through diagram of a multi-thousand number telephone system providing terminal-per-station service;

Fig. 3 shows a circuit diagram of a portion of the apparatus used in controlling the signalling equipment for terminal-per-station ringing; and Fig. 4 shows the apparatus of Fig. 3 modified according to the second embodiment of the invention.

Referring now to Figs. 1 and 2 of the drawings, the general purpose of the apparatus shown therein is to interconnect the subscriber stations with each other, as desired, on a terminal-per-station basis. This apparatus includes two line-link frames LLA and LLB, an office-link frame OLF, a thousands-link frame TLF, and a block-link frame BLF.

As described in the reference patent, the general purpose of any line-link frame is to connect subscribed lines associated with any one of its 250 line terminals with an idle one of a group of originating trunks, such as originating trunk 203A, and to connect any of its terminating trunks, such as terminating trunk 207B of line-link frame LLB, with any called idle subscriber line connected to its associated line terminals. Each line-link frame is provided with a number of line-link primary switches 800A1 and a number of secondary switches 900A1 interconnected by two-way line links, such as 202A and 202B, through which connections between lines and trunks are set up, and is provided with suitable control apparatus, such as line controller 1200A, for controlling the switches.

Line-link frames LLA and LLB are similar items of apparatus, each arranged to handle both originating and terminating calls, line-link frame LLA illustrated for handling originating calls and line-link frame LLB illustrated for handling terminating calls. As described in the United States patent application of J. I. Bellamy et al. for a Multi-Group Primary-Secondary-Spread Crossbar Telephone System, Serial No. 329,802, filed January 6, 1953, a system may comprise several 1000-number blocks, each block employing four line-link frames. Accordingly, in this disclosure it is assumed that line-link frame LLA serves terminals of one 1000-number block and frame LLB serves terminals of a separate block. It is therefore assumed that the 250 terminals, appearing on the LIDF as 701 to 950, are associated with a line-link frame which is a part of a first 1000-number block and the 250 terminals, appearing on the LIDF as 1701 to 1950, are associated with a line-link frame which is associated with a second 1000-number block. While this disclosure treats the line-trunk frames as frames of separate number blocks, it is understood that the invention could readily be applied to a system wherein both line-link frames are associated with the same number block, or with a number block of varying terminal capacity.

Referring now to the office-link frame OLF and the thousands-link frame TLF, these frames are similar to the combined office and thousands link frames of the noted multigroup crossbar system, excepting that such frames are shown separately in this disclosure. The office-link frame OLF functions to extend connections received over an originating trunk 203A to an idle outgoing trunk (not shown) extending to another office, or to an idle thousands trunk, 1–270–1 extending to the thousands-link frame in the local office, such selection being in accordance with the dialed office digit. The thousands-link frame TLF functions to extend the connections received over its thousands trunk 1–270–1 to an idle block coupler in the block-link frame of the 1000-number block serving the called line, such selection being in accordance with the dialed thousands digit. Both the office-link frame and thousands-link frame are provided with a number of primary switches and secondary switches interconnected by one-way links, such as 206L, through which the calling connection is extended to the noted block coupler, and are provided with suitable digit-recording and control apparatus for controlling the switches.

Referring now to the block-link frame BLF, its general purpose is to extend connections received from the thousands-link frame TLF to an idle terminating trunk, such as 207B, extending to the line-link frame terminating the called line. For this purpose, the block-link frame is provided with a number of primary switches, such as 1300, and a number of secondary switches, such as 1400, interconnected by block links 202L, and is provided with digit-recording apparatus, such as block couplers 500, for recording the digit information indicative of call-designation and for suitably coupling the calling connection with the called connection. The general control over the primary and secondary switches of block-link frame BLF is exercised by a block controller 1600 which controls the extension of the calling connection to an idle terminating trunk, such as 207B, together with a block translator 1800, which determines which one of the line-link frames associated with the concerned block-link frame terminates the line serving the called station. Block translator 1800 and block controller 1600 control the line controller apparatus on the called line-link frame to prepare for the extension of the connection to the specifically called terminal in the manner described in the reference patent. The block translator also controls the particular ringing current signal to be applied to the called line, such translator operation being described in detail hereinafter.

Referring now in particular to the LIDF, the jumpering arrangement shown thereon will be described.

As hereinbefore noted, systems providing terminal-per-station service have the individual lines connected to the switchboard terminals on a terminal-per-line basis, that is, the terminals which are assigned to the conductors of a connected line handle all calls originated from such line in addition to handling all calls directed thereto.

For two-party lines, however, the terminal set which is assigned the line conductors of a connected line handles all calls originated from both stations on such line but handles only the calls directed to one of the stations, another terminal set handling the calls to a second station. Accordingly, a two-party line requires two terminal sets, one set serving as a combined calling and called terminal set, the other serving as a called terminal set only.

For four-party lines, four terminal sets are required, each set being assigned a separate station. The line conductors of the four-party line are assigned to any desired one of the four sets, such set then functioning as a combined calling and called terminal set, the remaining three terminal sets serving as called terminals only.

The two-party and four-party lines accordingly must be jumper-connected to more than one terminal set. In order to enhance jumper installations, bunching blocks such as BB1 and BB2 are used to provide the necessary termination points.

It has been chosen to illustrate the two-party line 200 as associated with terminal sets 701 and 1701 (the LIDF appearance of such sets) terminal set 701 functioning as the combined calling and called terminal. Accordingly, jumpers 2022 and 2023 connect the bus-bar conductors of the line-connected bunching block BB1 to terminals 701 and 1701 respectively. Further, since it has been chosen to assign terminal set 750 for combined calling and called service, jumper 2021 connects line equipment 501—502 to such terminal set, line equipment 501—502 being chosen to function on all calls originated on line 200.

In a similar manner, four-party line 400 is associated with four terminal sets (terminal set 1950 being the only set shown) by jumpers 4021 to 4024. It has been chosen to assign line equipment 701—702 to terminal set 1950 by jumper 4025, terminal set 1950 accordingly functioning as the combined terminal set.

Line 300, being an individual line, has only one terminal set associated therewith, hence no bunching block is required as jumper 302 is connected directly to terminal set 950. Jumper 3021 connects line equipment 601—602 for service for line 300.

From the foregoing, it will be observed that any station may be assigned any desired terminal set, such station thereafter carrying the designation number of such set. Further, it will be observed that any one of the terminals assigned to a station associated with any line may be assigned to function as a combined calling and called terminal, this arrangement providing the noted true terminal-per-station service.

For purposes of clarity, it is assumed that the terminal set assignment to stations on a party line is in accordance with the station location. For example, the lower-numbered terminal set is assigned the first station, the second station being assigned a terminal set bearing a higher designation number, and so forth. Accordingly, terminal set 701 is assigned station 1 on line 200 and terminal set 1701 is assigned station 2.

The invention having been described generally, a more detailed descripton will be given of the operation of the system in extending a calling connection from a calling station on line 200 to station 4 on a called line 400.

When the receiver (not shown) is removed at the first station S of line 200, the usual direct-current bridge is closed across the line conductors L1 and L2, through MDF jumper 201, and through jumper 202 to the tip and ring bus-bars of bunching block BB1. This loop is further extended across the tip and ring conductors T and R of terminal set 701 over jumper 2022 and jumper 2021 to ground through break contacts 1 of cutoff relay 502 and to battery through the winding of line relay 501. Line relay 501 accordingly operates and at its make contacts 1 and 2, extends ground potential over the F and M conductors of jumper 2021 to the corresponding five and mark conductors of terminal set 701. The conductor M is individual to the calling line while the fives conductor F is common to five lines constituting the five groups in which the calling line is located.

As described in the reference patent, line controller 1200A (associated with terminal set 701) responds to the grounding of the marking conductors F and M by matching an idle path from the calling terminal set 701 to an idle originating trunk, such as 203A, this path being assumed to include line-link 202A. In order for line controller 1200A to select such an idle path, the calling line must be tested, and an idle line-link and an idle originating trunk must be tested and selected. The line must be tested to determine its idle or busy condition at a time the connection is to be completed as will be described hereinafter. The testing and the selecting of an idle line-link and an idle originating trunk is as described in the reference patent, the testing of the calling line and associated line terminals being somewhat altered.

In the reference patent, the sleeve conductor S of the calling line terminal set was tested for the appearance of battery potential thereon, which indicated that the battery supply to such sleeve was complete, this providing alarm features for indicating troubles, such as open fuses or open hold magnet windings. In the present disclosure, since the calling line may be connected to more than one terminal set, the calling terminal set must be tested to determine if any of the stations on the calling line had a connection extended thereto from another line-link frame during the interval after the receiver on the calling line initiated a call and before the line controller testing of the line-link and trunk was completed.

Assuming the line associated with terminal set 701 to be in an idle condition at the time the controller tests such set, exchange battery potential through the winding of cutoff relay 502 appears on the sleeve conductor S of terminal set 701 and further appears on the sleeve wire SU extending to controller LLA. This potential serves to indicate the idle condition of the calling line, as will hereinafter be described.

In the event the calling line is busy from a call directed to another station on line 200, ground potential from the sleeve conductor of the terminating trunk (such as 207B, of line-link frame LLB) being extended through the winding of the hold magnet HM703 (associated with terminal set 1701 connected to line 200) to battery through the winding of cutoff relay 502, lowers the battery potential on the sleeve conductor S of terminal set 701. Assuming the resistance of the cutoff relay winding and the hold magnet winding to be similar, the potential appearing on the sleeve terminal S of terminal set 701 would be approximately at half value. This lower voltage potential would accordingly appear on the units sleeve wire SU extending to controller 1200A and would serve to indicate that the calling line is busy.

In controller 1200A, originating start relay 12B10 is operated upon controller seizure in the manner described in the noted reference patent. Accordingly, sleeve units test wire SU is connected to the line side of the winding of test relay 12B16, the other side (equipment side) of the winding of such relay being connected through rectifier D1 and a resistance network, comprising resistors R101 and R102. The values of R101 and R102 are approximately in the ratio of three to one and accordingly maintain the equipment side of the winding of relay 12B16 at approximately three-quarters of the exchange battery supply when contacts 12 of originating start relay 12B10 apply ground to the resistor network.

Assuming that the sleeve of the calling line is in an idle condition, practically full exchange-battery potential appears on one side of the high-resistance line-test relay and three-quarters of the exchange-battery potential appears on the other side, operating line test relay 12B16.

Line test relay 12B16 upon operating, at its contacts 1, completes an operate circuit for operate relay 12B17, as described in the noted reference patent. Operate relay 12B17 operates and at its contacts 4, grounds the sleeve units wire SU to operate hold magnet HM403 and cutoff relay 502 in series. This operating ground also appears on the line side of the winding of line test relay 12B16, causing it to restore in a short interval of time as the current flow therethrough is reduced to zero, rectifier D1 preventing a reversal of current flow.

Responsive to the operation of hold magnet HM403, the loop bridged across the tip and ring conductors is extended over the corresponding conductors of originating trunk 203A to the selected office coupler 1000, associated with such trunk, operating line relay 1002. A short time thereafter, release relay 1004 operates and at its make contacts 1 returns ground potential on the sleeve conductor S to maintain the hold magnet and cutoff relay operated in series. In the interval between cutoff relay 502 operation and the return of ground from office coupler 1000, hold magnet HM403 is held operated from ground on wire SU as the operate relay is held operated until slow-operating clearout relay 12B18 operates.

Following the operation of the clearout relay, the line controller is released and the connection to office coupler 1000, through the selected line link 202A and originating trunk 203A, is held by ground on the sleeve conductor S form contacts of relay 1004.

Assuming that a terminating call is directed to terminal set 1701, associated with calling line 200, in the time interval between the removal of the receiver of the first station on line 200 to initiate line-switch action, and the operation of hold magnet HM403, terminal set 1701 tests idle and a terminating call is extended to such line. In such event, ground appearing on the sleeve conductor S of terminal set 1701 lowers the battery potential appearing on the units sleeve conductor SU to approximately half-value, as previously noted.

With the calling line so marked busy, test relay 12B16 has a lower potential on the line side of its winding than on its equipment side, and with rectifier D1 so poled that current flow therethrough is prevented, line test relay 12B16 fails to operate. Responsive to such failure to operate, clearout relay 12B18 operates to release the controller as described in the reference patent.

In the foregoing manner, a calling line, after line controller seizure, is tested to determine whether a terminating call has reached the calling line in the interval between the initiation and completion of the line-switch action.

Responsive to the noted seizure of the office coupler 1000 by controller 1200A, such coupler being marked idle by the appearance of battery on the sleeve conductor S from resistor 1010 and the calling terminal set 701 being marked idle, dial tone is returned to the calling subscriber and the office digit of the desired station thereafter is dialed. The office coupler and associated controller respond to the received office digit to control the primary and secondary switches associated therewith to select an idle path through an idle link, such as 206L, and over an idle trunk, such as 1-270-1, to the thousands-link frame, generally in the manner described in the noted reference multi-group system.

Following the dialing of the office digit, the subscriber dials the thousands digit of the desired subscriber directory number. The operation of the thousands-link frame in responding to such thousands digit is similar to the operations which occurred in the preceding stage, and the thousands coupler THC jointly with thousands controller TC control the thousand-frame switches TFS to further extend the connection to the block-link frame, corresponding to the called thousands group, and to seize an idle block coupler, such as coupler 500.

Responsive to the seizure of block coupler 500 by the described extension of a connection thereto from calling line 200 through line-link frame LLA, office-link frame OLF and thousands-link frame TLF, line relay 503 of coupler 500 operates.

The calling subscriber thereafter completes the dialing of the remaining digits of the directory number of the called subscriber, these digits comprising the hundreds, tens, and units digits.

Following the receipt and registration of the remaining digits of the directory number of the called line, block controller 1600 and block translator 1800 are called into operation and function generally as described in the noted reference patent.

Block controller 1600 cooperates with line controller 1200B (serving the called line terminal) to match a path to called terminal 1950 by way of the block-link switches associated with the calling coupler, an idle block link, an idle terminating trunk leading to frame LLB, and an idle line link accessible therefrom and leading to the primary switch serving the called terminal.

Block translator 1800, responds to the dialed digit information by translating such digit information into locational numbers identifying the called line-terminal location and in response thereto, line controller 1200B is set in accordance with such locational numbers as described in the noted reference patent. Controller 1200B connects (through contacts 4 of now-operated relay 12B9) the sleeve units wire SU, associated with the called terminal 1950 to wire CLS extending to block controller 1600 and signals the block controller that testing of the called terminal may begin.

Block controller 1600, in response to the noted signal, grounds the test start wire TS which operates slow-operating test relay 16A1 and energizes the voltage network comprising resistors R201 and R202. The network R201—R202 functions in a manner similar to the corresponding network of controller 1200A, to apply a voltage potential of approximately three-quarters of the exchange battery potential on the equipment side of the winding of idle relay 16A2 through rectifier D1, the other side of the winding of such relay being connected to the sleeve conductor S of the called terminal set 1950.

Responsive to the operation of relay 16A1, contacts 1 thereon remove the shunt across the upper winding of relay 16A1 and ground the upper winding of differentially-connected slow-operating busy relay 16A3.

Assuming the called line to be idle, approximately full exchange battery potential appears on the called sleeve conductor CLS, as noted, operating idle relay 16A2. Make contacts 1 thereof prepare an operate circuit for the operate relay 16A14, and make contacts 2 energize the lower winding of busy relay 16A3 to prevent it from operating, as the two windings thereon are differentially connected. Make contacts 2 also energizes the winding of match-start relay 16A5 through break contacts 1 of unoperated relay 16A3.

Assuming the called terminal 1950 to be marked busy, ground potential or a potential equal to approximately half of the exchange battery potential appears on the sleeve sleeve units wire SU. If terminal 1950 is included in a connection already established, ground from the associated coupler is present on the SU wire associated with such terminal or if another terminal (not shown) associated with line 400 is included in a connection already established, the noted half-value battery potential appears on the concerned SU wire. In either event, test relay 16A2 fails to operate and the lower winding of busy relay 16A3 is not energized. Accordingly, a short time later, relay 16A3 operates and at its contacts 2, grounds the busy wire BU to cause busy tone to be returned to the calling line and the seized common equipment to be released, in the manner described in the reference patent.

Match start relay 16A5 operates if the called line tests idle, and as described in the reference patent, functions to control the matching operation.

Responsive to a successful matching operation, operate relay 16A14 operates in preparation for completing the desired connection to the called line terminal 1950. Contacts 7 of relay 16A14 grounds the called sleeve conductor CLS to operate the hold magnet (not shown) associated with terminal set 1950 and the associated cutoff relay 602 in series; its contacts 1 ground the switch wire SW extending to the block translator 1800; and other contacts not shown, function to operate the other necessary magnets in the manner described in the reference patent.

Cutoff relay 602, upon operating, disconnects the associated line relay 601 from the called line to prevent answer by the called party from initiating line-switch action.

Block translator 1800 combines the ground signal on the switch wire SW with the recorded digit information to ground a selected one of the switch wires SW1 to SW4 to operate the corresponding one of the frequency relays (516 and 517) of block coupler 500 to control the application of ringing current to the called line, the detailed operation of which will be described hereinafter.

A short time thereafter, operations occur to clearout block controller 1600 and block translator 1800, leaving the connection intact from block coupler 500 through the selected block-link 202L, terminating trunk 207B, a line-link, such as 202B, line terminal set 1950, jumper 4021, and line jumper 402 extending to the called line 400.

Referring now to block coupler 500, and specifically to its ringing operation, ground on one of the switch wires SW1 to SW4, operates the concerned one or ones of the frequency relays 516 and 517 to apply the proper ringing-frequency to the called line through the ring cutoff relay 507.

Ground on wire SW1 operates the hold magnet HM2 directly, and causes generator-1 frequency to be applied to the called line through back contacts 2 of relays 516 and 517; ground on wire SW2 operates relay 517 which at its contacts 1, operates hold magnet HM2 and applies generator-2 frequency to the line; ground on wire SW3 operates relay 516 which at its contacts 1 operates hold magnet HM2 and applies generator-3 frequency to the line; and ground on switch wire SW4 operates both relays 516 and 517 to operate the concerned hold magnet and apply generator-4 frequency to the line. With the ringing equipment being controlled by the above noted relays and switch wires, block coupler 500 has been further modified to eliminate the station-last ringing equipment, such as stations register SR. Other than the above-noted modifications, the operation of block coupler 500 is generally as described in the reference patent.

In response to called party answer, following the application of generator-4 frequency to the called line as switch wire SW4 was grounded, back-bridge relay 502 operates from the closed line loop of the answering party and results in the operation of ring-cutoff relay 507, which trips the ringing circuit and aids in the completion of a talking connection.

The calling and called parties may thereupon converse, the clearout thereafter of the equipment being similar to that described in the reference patent.

The operation of the system in handling calls originated at a four-party line 400 or at an individual line 300 is generally as described with reference to the two-party line 200, the jumpering arrangement being disclosed for purposes of clarity in illustrating the flexibility of the system.

In the event the calling station desires another station on the same line, such as the station associated with terminal 701 desiring the station assigned terminal 1701, the usual reverting-call switch arrangement (not shown) is employed, thereby simplifying the block controller terminal-testing arrangement.

Referring now to Fig. 3 of the drawings, a detailed description of the operation of the noted added section of block translator 1800 in exercising control over the frequency selecting relays 516 and 517 of block coupler 500 will be given.

In order to control any block coupler to apply a separate station-ringing condition on any called party line according to the terminal through which it is called, arrangements are provided wherein each terminal called marks an individual wire which can be assigned as desired to control the noted switch wires SW1 to SW4 extending to the block couplers.

The translator of the reference patent, in responding to the called directory number, operates a hundreds register, a tens register, and a units register in accordance with the hundreds, tens, and units digit of such number. In order to provide 1000 wires corresponding to the 1000 directory numbers, arrangements have been provided wherein each hundreds register controls relays which select 100 wires of the required 1000. The tens registers and units register cooperate to select any desired one of the selected 100 wires, the ten registers each having 10 switching points which are controlled by the individual units registers.

Each hundreds register is associated with four relays of which only one relay is shown, such as relay 360 or 369. Each of these resulting 40 relays have 25 contacts associated therewith, the operation of any hundreds register thereby operating four relays to close 100 contact sets. With a separate wire being connected to each contact set, it can readily be seen that operation of the noted three registers results in the selection of one wire of the noted thousand. For example, assuming register H0, T0, and U0, to be operated, ground from contacts 1 of register U0 is extended through contacts 1 of register T0, this wire being designated wire 00. The ground on wire 00 is extended through contacts 1 on relay 360 to wire 000 extending to terminal board 340 from whence it may be assigned as desired to control the application of ground to any desired one of the four switch wires SW1 to SW4.

Four terminal strips 341 to 344 are provided, each being associated with a separate frequency-control relay such as relays 351 to 354, in a manner that ground appearing on any terminal strip operates the associated relay to complete the grounding of a corresponding switch wire. Accordingly, each of the 1000 ringing control wires are jumper-connected to the terminal strip which corresponds to the ringing frequency desired for the correspondingly called terminal.

Wire 000, corresponding to the terminal having a hundreds digit 0, a tens digit 0, and a units digit 0 in its directory number, is assigned by jumper 346 to strip 341 and frequency relay 354. Ground on wire 000 is thereby extended through the windings of relay 354 and alarm relay 356 in series to battery. Relay 354 operates and at its contacts connects the noted grounded switch wire SW to wire SW4 to operate relays 516 and 517 of block coupler 500.

In a similar manner, ground on wire 900 and associated jumper 347 operates relay 353 to connect switch wire SW3 to wire SW; ground on wire 997 and jumper 348 operates relay 352 to connect wire SW2 to wire SW; and ground on either ringing control wires 998 or 999 over respective jumpers 349 and 350 operate relay 351 to connect switch wire SW to wire SW1.

It can thus be seen that any terminal may be assigned any ringing frequency by assigning a jumper between the associated ringing-control wire and the desired one of the ring-control relays 351 to 354.

Alarm relay 355, is included in the operate circuit of any one of the frequency relays and is slow-operating such that in the event the block translator 1800 is not cleared out after a predetermined interval of time, an alarm will be given.

Referring now to Fig. 4 of the drawings, a second embodiment of the added section of block translator 1800 will be described. This embodiment is in contrast with the first embodiment in that the ringing frequencies to be applied to the called lines are handled in groups of 250 terminals each. For example, the terminals associated with the first line-link frame are all signaled by the first frequency, the terminals on a second line-link frame are signaled by a second frequency, and so forth. This arrangement is much more economical than the individual-translating embodiment but does not have its degree of flexibility.

As described in the reference patent, block translator 1800 grounds one of 40 primary wires P to identify the switch serving the called line, each line-link frame being associated with 10 such primary wires.

In Fig. 4, the ten primary wires P1 to P10 of line-link frame A are associated with the first frequency control relay 451; wires P11 to P20 of line-link frame B are associated with relay 452; wires P21 to P30 of line-link frame C are associated with relay 453; and wire P31 to P40 are associated with relay 454.

In this arrangement, calls to terminals associated with line-link frame A result in the grounding of one of the primary wires P1 to P10 which operates relay 451 to connect wire SW to wire SW4. Ground on wire SW4 controls coupler 500 to apply frequency-1 ringing current to the line associated with the called terminal. In like manner, frequencies 2 to 4 are applied to lines associated with terminals in respective line-link frames B to D.

Each of the relays 451 to 454 have ten rectifiers associated with the respective primary wires to prevent any ground potential backup from occurring between the adjacent primary wires of any one frame.

The alarm relay 455 functions in the manner similar to that described with reference to Fig. 3 of the drawings.

In both Figs. 3 and 4 of the drawings, clearout by the block translator results in the restoration of the associated operated frequency control relay.

While we have described above the principles of our invention in connection with specific apparatus, it is to be clearly understood that this description is made only by way of example and not as a limitation to the scope of our invention.

We claim:

1. In a switchboard for use in a party-line telephone system to extend switchboard connections from calling ones to respective called ones of a group of telephone lines each having one or more stations thereon, terminals corresponding respectively and individually to the stations and having respective telephone numbers assigned thereto which comprises the telephone numbers of the respective said stations, first adapting means comprising means for connecting any said terminal to serve as a called terminal for any line on which the corresponding station may be located and for connecting to any party line as called terminals, all said terminals which correspond respectively to the stations thereon, means for extending a switchboard connection to any line through any said connected terminal thereof whose telephone number is called, means for applying signalling current to to called party line selectively according to the connected terminal thereof through which the connection is made, second adapting means for adapting any said called terminal to serve also as the calling terminal for the line to which it is connected, means responsive to a call originated at any station on a line having a last said terminal connected thereto for identifying such terminal as that of a calling line, and means for extending a switchboard connection from the calling line through its identified calling terminal.

2. In a switchboard according to claim 1, the said means for extending a switchboard connection to any line comprising automatic switching means which operates responsive to the calling of the pertaining telephone number, and the said means for applying signalling current to a called party line selectively comprises means also responsive to the calling of the last said telephone number.

3. In a switchboard for use in a party-line telephone system to extend switchboard connections from calling ones to respective called ones of a group of telephone lines each having one or more stations thereon, terminals corresponding respectively to the stations and having respective telephone numbers assigned thereto, first adapting means for adapting any said terminal to serve as a called terminal for any line on which the corresponding station may be located comprising means for connecting to any party line as called terminals all said terminals corresponding respectively to the stations thereon, means for extending a switchboard connection to any line through any said connected terminal thereof whose telephone number is called, means for applying signalling current to a called party line selectively according to the connected terminal thereof through which the connection is made, second adapting means for adapting any said called terminal to serve also as the calling terminal for the line to which it is connected, means responsive to a call originated at any station on a line having a last said terminal connected thereto for identifying such terminal as that of a calling line, means for extending a switchboard connection from the calling line through its identified calling terminal, the said means for identifying a terminal as calling including a group of line equipments at least equal to the number of connected lines and less than the number of terminals, and means included in the said second adapting means for connecting any line equipment to any desired line and for adapting such line equipment to identify any desired terminal thereof as a terminal of a calling line.

4. In a switchboard according to claim 3, each said line equipment comprising a line relay responsive to the origination of a call at any station on the associated connected line and a cutoff relay for disconnecting the line relay, each line relay having terminal-identifying contact means adaptable by a said adapting means to identify any said terminal as that of a calling line, and means responsive to a switchboard connection to any terminal of a line for operating the associated cutoff relay.

5. A switchboard for extending connections from calling ones to respective called ones of a group of lines, the switchboard comprising sections with each section containing a separate group of connecting paths and separate switching apparatus for connecting such paths respectively with lines, at least some of the lines appearing in two or more sections, means for marking any line busy responsive to the connection of any said connecting path thereto, test means common to the connection paths of any switchboard section, means for connecting the test means to any indicated line to which a connecting path of that section is to be connected, means controlled by the test means subject to the line not then testing busy for initiating action of the switching apparatus of the section to select a connecting path to the indicated line, means for connecting to the indicated line the connecting path so selected, and means controlled by the test means for precluding the start of the action of the connecting means responsive to the indicated line having been marked busy at another switchboard section during the said selection of a connecting path thereto.

6. A switchboard according to claim 5, wherein each line is normally marked idle by a first potential, and the said marking of a line busy comprises effectively applying a second potential thereto in substitution of the first, the said test means including a polarized potential-comparing device and circuit means connecting it between the line and a test potential which lies between the said first and second potentials.

References Cited in the file of this patent

UNITED STATES PATENTS

| | | |
|---|---|---|
| 2,603,713 | Ostline | July 15, 1952 |
| 2,725,428 | Bellamy et al. | Nov. 29, 1955 |
| 2,754,368 | Dunlap et al. | July 10, 1956 |